May 31, 1927.
M. BOUFFART
1,630,289
APPARATUS FOR MEASURING AND DISTRIBUTING LIQUIDS
Filed Aug. 4, 1924  2 Sheets-Sheet 2
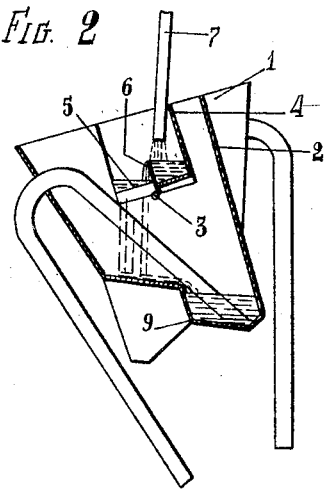
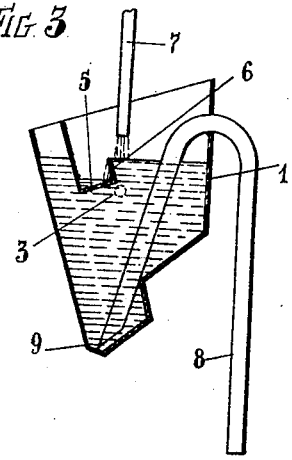
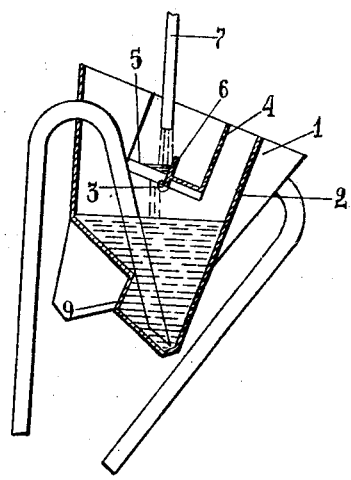
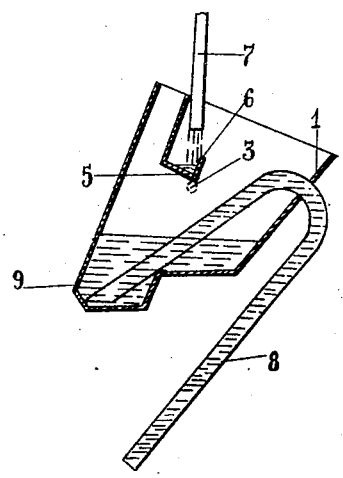
Inventor:
Maurice Bouffart
Attorney Patented May 31, 1927.

1,630,289

UNITED STATES PATENT OFFICE.

MAURICE BOUFFART, OF HERSTAL, NEAR LIEGE, BELGIUM.

APPARATUS FOR MEASURING AND DISTRIBUTING LIQUIDS.

Application filed August 4, 1924, Serial No. 730,024, and in Germany August 15, 1923.

The present invention relates to apparatus for ensuring the measurement of liquids or their distribution at regular or irregular intervals.

It relates more particularly to apparatus of this kind constituted by a number of receptacles adapted to move around an axis of oscillation.

The apparatus of this kind hitherto employed are measurers of weight. Furthermore the oscillatory movement offers numerous inconveniences which result from the fact that all retardations or advances, which are inevitable in the oscillation of the receptacles, immediately and directly introduce errors into the measurement.

In particular any variation of the intensity of the friction or shocks modifies the weight of liquid necessary to produce the working of the apparatus and the measuring is thus falsified.

The present invention relates to a liquid meter which utilizes the known means of oscillating receptacles but in such a way that the oscillating movement, when slightly advanced or slightly retarded, has no influence on the perfect accuracy of the measurements.

The oscillation is produced by the liquid which is admitted to an eccentric portion of the movable system, starting from the moment when one of the receptacles is exactly filled, the oscillation then producing the emptying thereof. This liquid in excess may be admitted by an overflow above a weir or dam formed by one wall of the full receptacle or by any other means.

The liquid in excess which collects in the eccentric part hereinabove referred to progressively displaces the centre of gravity of the system until it passes over to the other side of the axis of oscillation, thus producing the oscillation of the system.

This oscillation sets the emptying system of the filled receptacle in operation and at the same time brings another receptacle into communication with the source of liquid supply.

It will be understood that if, in consequence of any circumstances, the weight of liquid necessary to produce the oscillating movement should happen to vary, say for example owing to greater friction to be overcome or for any other reason, this variation will in no way cause any error because each receptacle will receive in succession the same volume of liquid and the liquid which has overflowed will form part of the volume measured and distributed by the other receptacle on the next oscillation.

According to the constructional form shown in the drawings the apparatus is constituted by two receptacles connected together along the direction of the axis of oscillation; the upper parts of the receptacles having passed through them a weir or dam arranged parallel with the axis of oscillation. The weir or dam, throughout the whole of its length, has joined to it two gutters which prolong each of the said receptacles into the interior of the other towards the aforesaid eccentric part, these receptacles being supplied by one or more devices arranged along the axis of oscillation.

In order to render the oscillating movement of the system automatic, each receptacle has an eccentric portion in which the liquid acts that overflows from the other receptacle.

The liquid enters one of the receptacles while the other is emptying and during a period of time which must be less than that which is necessary for this emptying.

This operation of emptying may be effected by any well known means and in particular by siphons the elbow of each of which is arranged at a certain distance from the axis of oscillation, and at such a height that during the refilling of the receptacle considered, it will be above the highest level attained by the liquid, while after the oscillation has taken place it descends below the level of the liquid.

Other characteristic details of the invention will be found in the rest of the description of the accompanying drawings. In these drawings:—

Figures 2 and 3 show two transverse sections taken through the two receptacles at the moment they are about to oscillate.

Figures 4 and 5 show two transverse sections taken through the two receptacles above mentioned shortly after they have oscillated.

Figure 1:
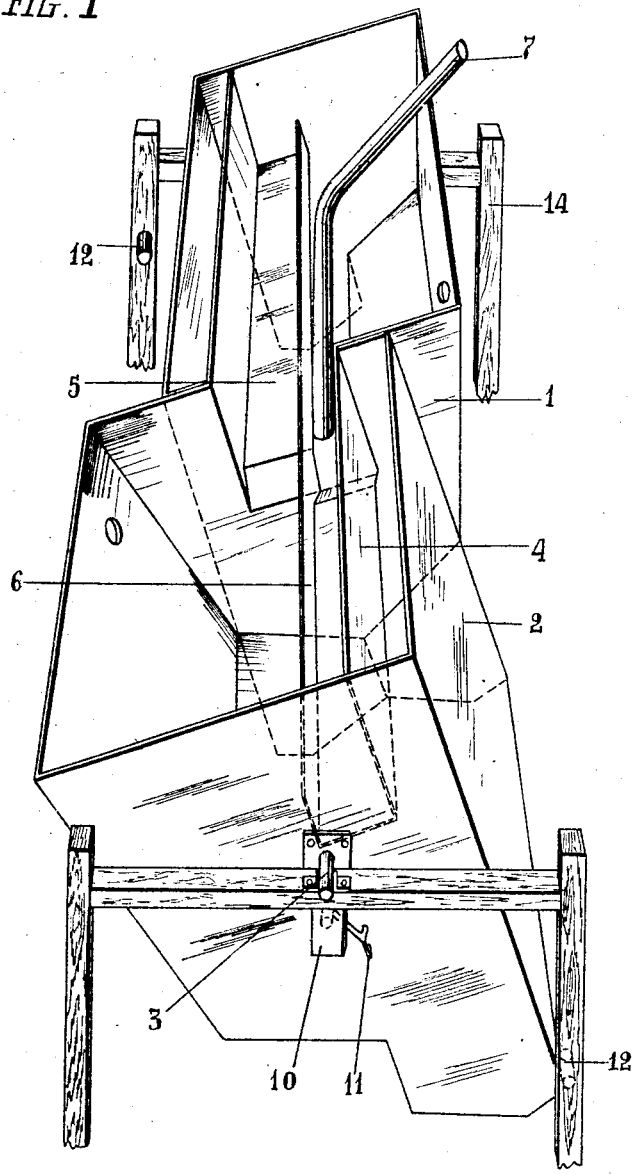
Figure 1 shows diagrammatically in perspective the apparatus according to the present invention.

The apparatus comprises two tanks or vats 1 and 2 which are connected together in a direction parallel with the axis of oscillation of the system which turns on pivots 3 (of which only one is visible in the drawing) fixed to two end walls and supported by a framework 14 represented diagrammatically.

The wall common to these two tanks 1 and 2 is cut away to form an opening which puts the two tanks into communication by the aid of gutters 4 and 5 which extend respectively to the upper part of the tanks 1 and 2 and on either side of a partition 6 which plays the part of a weir or dam as will be explained later on and is situated above the axis of oscillation.

This apparatus is supplied by a pipe 7 the outlet orifice of which is situated above the axis of oscillation in such a way that the liquid delivered by this pipe is received either by the gutter 4 and the tank 1 (see Figures 2 and 3) or by the gutter 5 and the tank 2 (see Figures 4 and 5), according as the apparatus occupies one or other of these two positions of equilibrium.

The passage from one of these two positions to the other will, at the same time, also permit the emptying device with which each tank is provided to come into operation. This device is constituted by a siphon 8 the elbow of which is arranged at a certain distance from the axis of oscillation and at such a height that during the filling of the tank considered it is situated above the highest level attained by the liquid (see Figure 3) while after oscillation has taken place it descends below the maximum level of the liquid which permits of the starting of the siphon (see Figure 5).

In order to make Figure 1 clearer the above mentioned siphons are not shown.

According to the position of the apparatus shown in Figures 1, 2 and 3, it has oscillated towards the left and in such a way that the supply pipe 7 delivers the liquid into the tank 1 either directly or by the intermediary of the gutter 4. The form of this tank 1 is such that during the filling thereof the centre of gravity remains on the same side of the axis of oscillation.

As soon as the water attains the level in the tank shown in Figure 3, it passes over the weir or dam 6 all along its length and runs into the tank either directly by escaping from the gutter 4, or by passing through the gutter 5 which conducts it into the tank 2.

The water thus diverted into tank 2 collects at its lower part in a trench 9 out of line with the axis and moves gradually to the right towards the centre of gravity of the movable system until the moment arrives when the centre of gravity which was originally on the left of the axis of oscillation passes over on to the right hand side thereof and thus brings about the oscillation of the system into the other position of equilibrium.

As has been explained above, this oscillation has the effect of putting an end to the admission of liquid to the tank 1, producing on the other hand the emptying thereof by the starting of its siphon. At the same time the other tank 2 is brought beneath the supply pipe 7 for the liquid so as to recommence the same operation as that which has been described above. It will be seen however that the filling of each of the tanks must last at least as long as the emptying of the other so that the filling may be completed before the oscillation is produced.

The two tanks constituting the apparatus that forms the subject matter of the present invention thus empty themselves alternately and one empties while the other is filling.

With regard to the supply of the liquid from the supply pipe 7, it will be understood that it may be more or less rapid on condition that it establishes in correspondence the supply of the emptying system in such a way as to conform to the conditions laid down above. In like manner the supply must be intermittent and be effected through one or more openings which may be fixed or movable along the axis of oscillation.

With regard to the emptying of the tanks, it would be quite possible to use several siphons and to connect to them one or more openings, weirs, dams or other similar devices designed to effect the partial emptying of the apparatus and constrictions wherever they may be placed, on the same conditions as those already laid down for the said siphons. It will likewise be possible to have recourse to the combinations of the well known type of two or more siphons, the function of the first one of which is to start the others, or to effect the emptying of the tanks by valves.

It will be understood from the above description that the volume delivered at each oscillation will be constant whatever the specific gravity of the liquid handled may be, since the oscillation of the apparatus and consequently the emptying of one of these tanks can only be effected after the latter has been filled and the liquid in excess has run off into the other receptacle in such a way as to bring about the oscillation of the vessel.

The weight of the liquid which overflows, which is necessary to produce the oscillation of the tanks, may, as has been stated above, vary owing to friction or through the system getting out of equilibrium in some way or other, but it will be understood that this variation will in no case constitute any cause of error because the liquid which overflows in this way will form part of the volume measured and delivered at the next oscillation.

It will be understood however that the water in the full tank will attain a slightly higher level than that in the weir or dam and which will be a function of the feed of the said tank. For this reason it will be advantageous to reduce this volume of liquid which constitutes the error as much as possible by reducing the horizontal section of the tanks at the level of the weir or dam to the strict minimum or by the extension of the wall over which the liquid in excess flows.

The apparatus thus constructed can be used as a meter or counting apparatus or as a distributing apparatus.

In the first case, whatever be the method of feeding the liquid to the apparatus, this latter discharges the liquid in accurately determined volume at each cycle of oscillation and it suffices to add up the number thereof by means of any kind of mechanical counting apparatus 10 operated by a finger 11 fixed to one of the tanks in order to deduce therefrom the measure of the volume delivered in a certain time.

The apparatus will also permit of a continuous supply being transformed into an intermittent supply.

Although this condition is not indispensable, two stops 12 are provided on the framework 14 so as to limit the period of oscillation of the apparatus.

I claim as my invention:

1. Apparatus for measuring and distributing liquids, comprising a unit mounted to oscillate about a horizontal axis and embodying a pair of measuring receptacles, means providing communication between said receptacles at a predetermined level to deliver excess liquid from one to the other, and means for shifting the center of gravity of the unit automatically from one side of such axis to the other in alternation by the action of the excess liquid so delivered so as to rock the unit about said axis first in one direction and then in the other.

2. Apparatus according to claim 1, in which the shifting means embodies an eccentric portion provided in each receptacle to receive and collect the excess liquid delivered thereto from the other receptacle, such portion being disposed at opposite sides of the axis of oscillation of the unit.

3. Apparatus for measuring and distributing liquids, comprising a unit mounted to tilt about a horizontal axis and embodying a pair of measuring receptacles, means providing communication between said receptacles at a predetermined level to deliver excess liquid from one to the other, means whereby the unit is caused to tilt automatically by the action of the excess liquid so delivered, and a siphon in each receptacle for emptying the same when filled; such siphon being normally inoperative but rendered operative consequent upon the movement of a filled receptacle incidental to the tilting of the unit.

4. Apparatus for measuring and distributing liquids, comprising a unit mounted to tilt about a horizontal axis and embodying a pair of measuring receptacles, means providing communication between said receptacles at a predetermined level to deliver excess liquid from one to the other; each receptacle having an eccentric portion to receive and collect the excess liquid delivered thereto from the other receptacle so as to shift the center of gravity of the unit from one side to the other of said axis and thereby cause the unit to tilt; and a siphon in each receptacle for emptying the same when filled; such siphon being normally inoperative but rendered operative consequent upon the movement of a filled receptacle incidental to the tilting of the unit.

5. Apparatus for measuring and distributing liquids, comprising a unit mounted to tilt about a horizontal axis and embodying a pair of measuring receptacles, means providing communication between said receptacles at a predetermined level to deliver excess liquid from one to the other, means whereby the unit is caused to tilt automatically by the action of the excess liquid so delivered, and a siphon in each receptacle for emptying the same when filled; such siphon having its elbow disposed above said communication level during the filling of the respective receptacle, and below such level after tilting has taken place.

6. Apparatus for measuring and distributing liquids, comprising a unit mounted to tilt about a horizontal axis and embodying two measuring receptacles, a dam or weir extending through the upper part of said receptacles and over which flows the liquid delivered in excess to either receptacle; said dam or weir being provided at opposite sides with a pair of longitudinal gutters, one gutter adapted to deliver the excess liquid to one receptacle, and the other gutter to the other receptacle; and means whereby the unit is caused to tilt automatically by the action of the excess liquid so delivered.

7. Apparatus for measuring and distributing liquids, comprising a unit mounted to oscillate about a horizontal axis and embodying two connected, open-topped measuring receptacles, and means providing communication between said receptacles at a predetermined level to deliver excess liquid from one to the other, each receptacle having an eccentric portion to receive and collect the excess liquid delivered thereto from the other receptacle, such portions being disposed at opposite sides of said axis so as to shift the center of gravity of the unit automatically from one side of the axis to the other in alternation and thereby rock the unit about said axis first in one direction and then in the other.

In testimony whereof I have affixed my signature.

MAURICE BOUFFART.